United States Patent
Jarvis et al.

(10) Patent No.: US 10,515,266 B1
(45) Date of Patent: Dec. 24, 2019

(54) DOCUMENT VERIFICATION BY COMBINING MULTIPLE IMAGES

(71) Applicant: Capital One Services, LLC, McLean, VA (US)

(72) Inventors: Daniel Alan Jarvis, Vienna, VA (US); Jason Pribble, McLean, VA (US); Nicholas Capurso, Tysons Corner, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/542,446

(22) Filed: Aug. 16, 2019

(51) Int. Cl.
*G06K 9/00* (2006.01)
*G06T 7/00* (2017.01)
*G06K 9/32* (2006.01)

(52) U.S. Cl.
CPC .......... *G06K 9/00463* (2013.01); *G06K 9/32* (2013.01); *G06T 7/0002* (2013.01); *G06T 2207/20021* (2013.01); *G06T 2207/30168* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 7,639,858 B2 * | 12/2009 | Ross | G06K 9/6229 356/71 |
| 8,768,048 B1 * | 7/2014 | Kwatra | G06K 9/72 382/159 |
| 9,672,510 B2 | 6/2017 | Roach et al. | |
| 2002/0044677 A1 * | 4/2002 | Fox | G06K 9/00 382/135 |
| 2013/0148902 A1 * | 6/2013 | Hyde | G06T 7/0012 382/199 |
| 2017/0132866 A1 | 5/2017 | Kuklinski et al. | |
| 2017/0287252 A1 * | 10/2017 | Laddha | G06K 9/4604 |
| 2018/0082145 A1 | 3/2018 | Mattes | |
| 2019/0012558 A1 | 1/2019 | Dura et al. | |
| 2019/0070887 A1 | 3/2019 | Peters et al. | |

* cited by examiner

*Primary Examiner* — Vikkram Bali
(74) *Attorney, Agent, or Firm* — Sterne, Kessler, Goldstein & Fox P.L.L.C.

(57) ABSTRACT

Disclosed herein are system, method, and computer program product embodiments for verifying a document. An embodiment operates by receiving an initial image of a document and identifying a first imperfection on a feature of the document. Thereafter, the feature of the initial image is segmented into a first and second partially overlapping segment corresponding to a first and second portion of the feature, respectively. Subsequently, the feature's first portion is determined to be free from the first imperfection, and the first imperfection is identified in the feature's second segment. After receiving a second image of the document including the feature's second portion, the feature's second portion in the second image is determined to be free from a second imperfection. As a result, an image of the feature is created based on the first and second portions of the feature derived from the initial and second images, respectively.

19 Claims, 11 Drawing Sheets

DOCUMENT VERIFICATION BY COMBINING MULTIPLE IMAGES

BACKGROUND

Mobile devices permit users to upload documents to remote sites. To do so, users are permitted to take and submit photos of the documents. As a result, users regularly encounter imperfections on photos of their documents. For example, at any angle, a user points a camera towards the document, the resulting image of the document will have an imperfection. Therefore, recipients may be unable to process images having such imperfections.

In addition, recipients regularly receive images of inauthentic or fake documents. For example, a driver's license may be physically or digitally altered to have a different person's photo. Moreover, fictitious driver's licenses may be uploaded. Thus, recipients of inauthentic or fake documents may be unaware of their manipulation.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for verifying a document. The document may be an official document (e.g., a document that has a contractual relationship or grants a legal right) that is unique to a user. Examples of an official document include a driver's license, a passport, an identification card, and a credit card, just to name a few examples.

The present disclosure describes a system for verifying a document acquired by a user device (e.g., mobile phone). In some embodiments, the system operates by allowing a user to take numerous pictures of a document to be forwarded to a third party. Unbeknownst to the user, the system acquires overlapping portions of the document in the pictures of the documents. The overlapping portions may relate to particular portions of the document. For example, the overlapping portions may include an entire security feature or a border of the security feature. This allows the system to analyze the characteristics of the overlapping portions (e.g., color, text, and spatial domains) to verify that the document is authentic and not fake. Along these lines, this allows the system to confirm that the document to be verified is not altered digitally or in its natural form.

Along these lines, while acquiring the photos, the user devices may be acquiring an imperfection (e.g., a glare) on a portion of the document. This may prevent the system from detecting features on or around the imperfection. Accordingly, the system may require the user devices to acquire additional images of the document with the imperfection being on different portions of the document. In doing so, the system may require the imperfection on subsequent photos of the document to be a certain distance away from the previous imperfection. This allows the system to permit a user to take multiple photos of an image having an imperfection, while confirming that the document is authentic and not fake, as well as permit to verify that the document is authentic and not fake. In other words, the user will need to take numerous pictures from different perspectives or from a different location.

Figure 1:
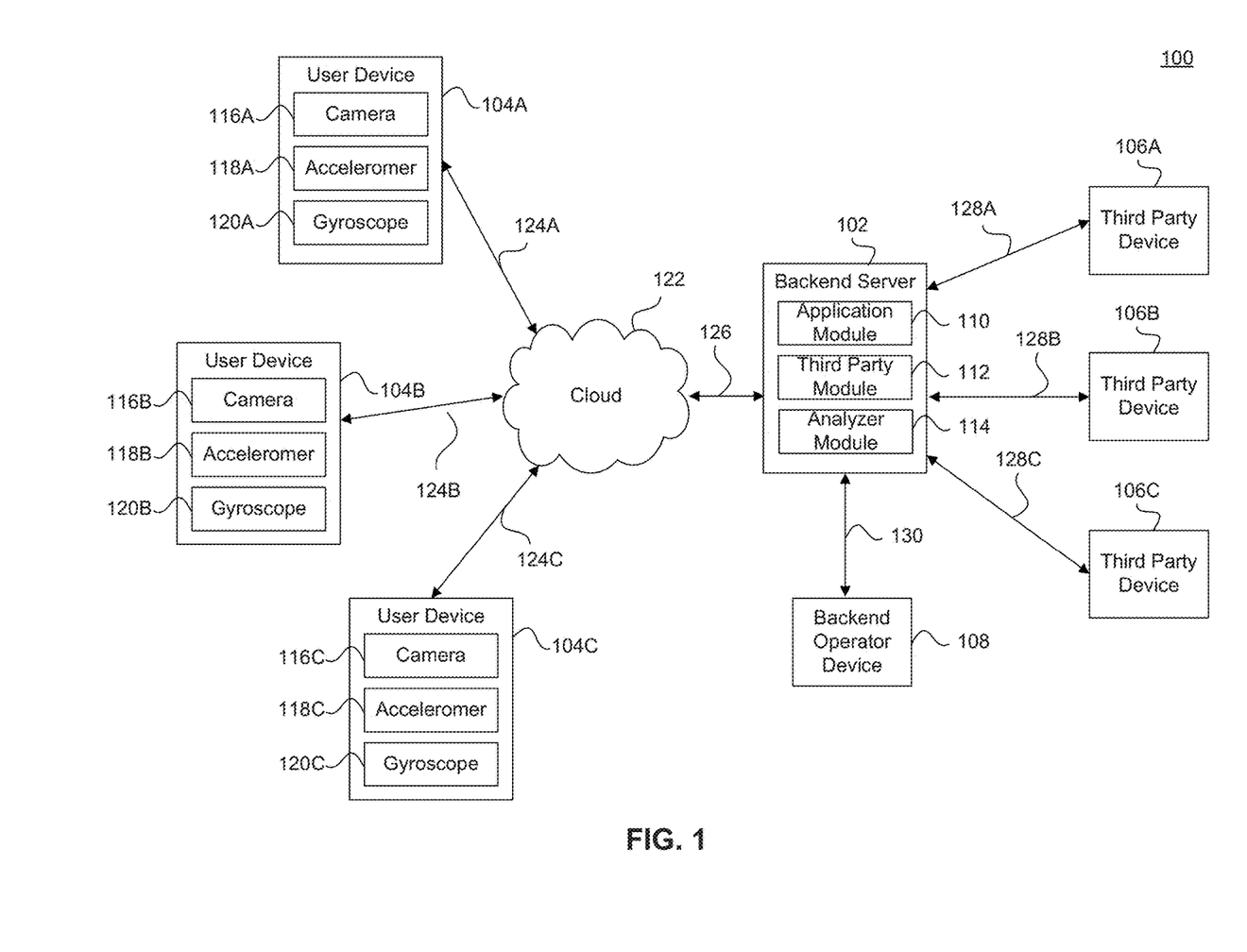
FIG. 1 illustrates a block diagram of a system for verifying a document, according to some embodiments.

FIG. 1 illustrates a block diagram of a system 100 for verifying a document, according to some embodiments. The system 100 includes a backend server 102, one or more user devices 104A-C, one or more third-party devices 106A-C, and/or a backend operator device 108. These devices may be physical or virtual and may be managed by different or the same entities. For example, the backend server 102 and the backend operator device 108 may be managed by a specific entity offering the verification of a document, the user devices 104A-C may be managed by users possessing/having the document, and the third-party devices 106A-C may be managed by entities producing the document, providing data issued on the document (e.g., address, driver license number, picture, etc.), or verifying the data on the document.

Backend server 102 performs the verification of images of documents received from user devices 104A-C. The backend server 102 includes an application module 110, a third-party module 112, and an analyzer module 114. The application module 110 contains various data models associated with verifying images of the documents. In some embodiments, the application module 110 may store data models for specific entities (e.g., banks, department stores, and restaurants, just to name a few examples). As such, the application module 110 may also store these entity's applications and provide them to the user devices 104A-C. In some embodiments, the application module 110 may store generic data models that apply to a wide variety of applications.

The backend server 102's third-party module 112 stores characteristics of an authentic document based on data received from the third-party devices 106A-C. For example, third-party devices 106A-C may provide an authentic replication of the document. And the third-party devices 106A-C may provide information of features of the document (e.g., security and/or non-security features), as will be described in more detail below, and their spatial domain in the image of the document. As such, third-party devices 106A-C may include federal government databases, state government databases, university databases, and place of business databases (e.g., place of user's occupation), just to name a few examples.

The backend server 102's analyzer module 114 may determine an authentic document for analyzing user-provided images of such documents based on data received from the backend operator device 108. For example, the backend operator device 108 can provide the backend server 102 with real and fake documents. And the backend server 102 may then perform machine learning on the real and fake documents to construct a mathematical model of a real document. The machine learning applied to the real and fake documents may be those customary and understood by those of ordinary skill in the art. In some embodiments, machine learning may use a convolutional neural network (CNN) to analyze the documents. As such, based on the mathematical model (e.g., of the convolutional neural network), the backend server 102 may determine if photos of documents provided by the user devices 104 are real, fake, or digitally manipulated. And after documents are determined as real or fictitious, the backend server 102 may improve the mathematical model.

Accordingly, the backend server 102 is in communication with the user devices 104A-C, the third-party devices 106, and the backend operator device 108. In some embodiments, the server 102 is in communication with the user devices 104A-C via a cloud communications network 122. And the backend server 102 is in communication with the cloud communications network 122 over a communication line or medium 126, which may be public. As such, the backend server 102 may be cloud-based and thus may provide access to user devices 104A-C from anywhere and at any time that the cloud communications network 122 is enabled. Moreover, the backend server 102 is in communication with the third-party devices 106A-C and the backend operator device 108 over a first and second communication line or medium 128A-C and 130, respectively, which both may be private.

User devices 104A-C acquire images of documents and provide them to the backend server 102. In doing so, the user devices 104A-C may be a handheld. For example, user devices 104A-C may be a cellular phone, a palm-top, a personal digital assistant, or a mobile device, just to name a few examples.

User devices 104A-C may have an installed computer application provided and managed by the entity managing the backend server 102. Upon receipt of images documents, the computer application may provide them sequentially to backend server 102. The mobile application may be in communication with backend server 102 to provide feedback to the user at user devices 104A-C, as will be discussed in more detail below.

To receive images of documents, user devices 104A-C include a camera 116A-C. As such, via the cameras 116A-C, the user devices 104A-C may be configured to take still images (e.g., pictures) and videos. As such, in some embodiments, the still images may be manually taken by a user of the user devices 104A-C. And, in some embodiments, the images are acquired as a series of images (e.g., as a part of a video) of the document of a predefined length (e.g., 15 seconds, 30 seconds, or 1 minute). The series of images may be taken as a result a single action of a user (e.g., pressing a button). Thus, the user devices 104A-C may be able to acquire a series of still images automatically. And when acquiring the still images of the document, the user devices 104A-C may provide timestamps as well as fragment one or more portions of the image so that features of one image of the document may be analyzed with features of another image of the document.

User devices 104A-C may also include an accelerometer 118A-C and a gyroscope 120A-C. As such, via the accelerometer 118A-C, the user devices 104A-C may determine a distance that the user devices 104A-C moved (e.g., up, down, left, or right) while acquiring images of the document. And, via the gyroscope 120A-C, the user devices 104A-C may determine an orientation (e.g., an angle) of the user devices 104A-C relative to the document while acquiring images of the document. As such, the user device 104A-C may use simultaneous localization and mapping (SLAM) algorithms—understood and known to those of ordinary skill in the art—to identify a location and/or orientation of the device relative to the document while acquiring images of the document.

Along these lines, the user devices 104A-C transmit images to the backend server 102 over the cloud communications network 122. As such, user devices 104A-C are in communication with the cloud communications network 122 over communication line or medium 124A-C, which may be public or private. As such, the user devices 104A-C may be permitted to access the cloud communications network 122 from anywhere and anyplace.

Figure 2:
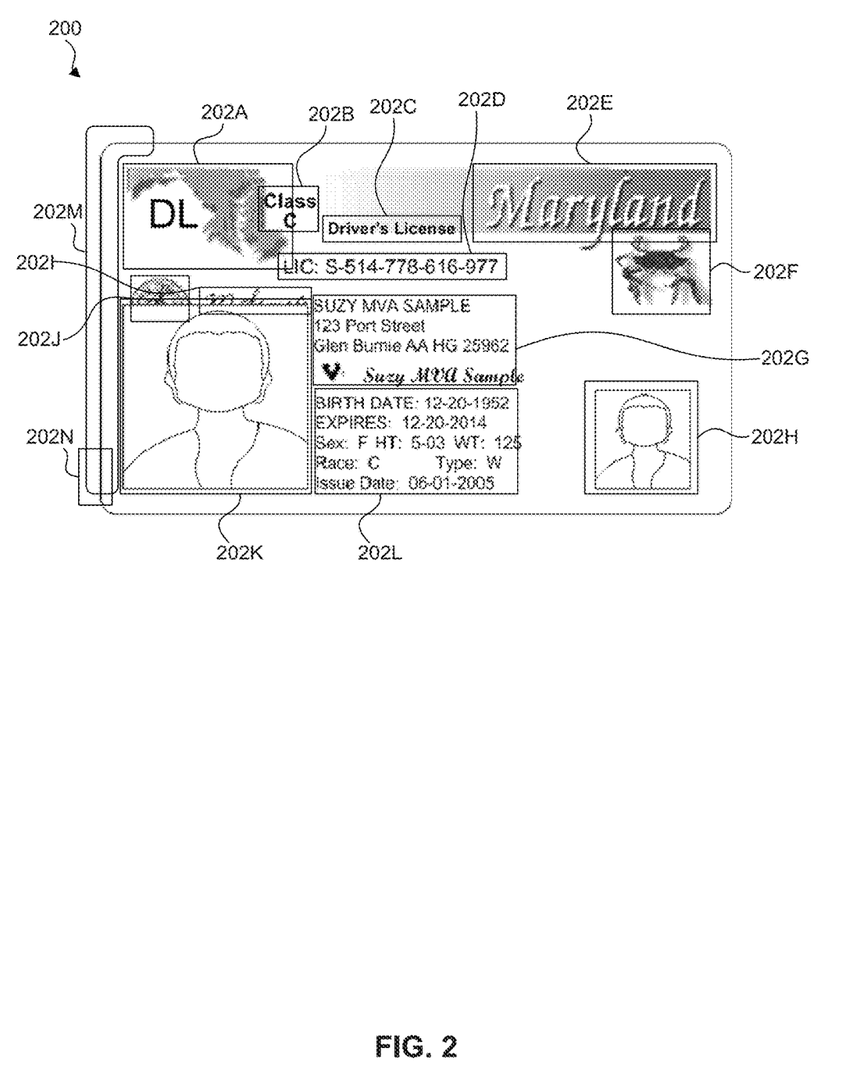
FIG. 2 illustrates features of an example document, according to some embodiments.

FIG. 2 illustrates a document 200 containing various features 202A-N capable of being detected by the backend server 102 (of FIG. 1), according to some embodiments. The document 200 may be any type of authentic document. In some embodiments, the document 200 may be unique to a user. For example, the document 200 may be a form of identification for a user. Specifically, as illustrated, the document 200 may be a driver's license. The document 200 may also be a passport, a birth certificate, a credit card, a bill, or a tax statement, just to name a few examples. In some embodiments, the document 200 may be generic (e.g., irrespective, or not relating, to a specific user). As such, the document 200 may relate to a product, a building, a certificate. For example, the document 200 may be a purchase order of goods, a building specification, a certificate of occupancy, just to name a few examples.

In some embodiments, the features 202A-L may be text or images on a surface of the document 200 or within the document 200. The text or images may be color and may be three-dimensional (e.g., outwardly rise from the surface of the document). The text of images may overlap and may only partially be visible (e.g., features 202A/202B/2021/202J). In some embodiments, the features 202M-N may be a part (e.g., corner) of the document. And the part of the document may have a defined structure (e.g., curves, rigid, or patterned).

In some embodiments, the features 202A-L may be security features and/or non-security features. The security features may be provided to defy manipulation of the document including, but not limited to, creating a fictitious document replicating an authentic document and modifying text or images on the document. As such, the security feature may be overt or covert. And the security features may be visible or invisible to the naked eye. In some embodiments, the security features may be generic and thus may not be applicable to a user of the document 200. For example, the feature 2021 may be an emblem. In some embodiments, the security feature may be unique to an owner of the document. For example, as illustrated, the feature 2021 may be a signature. As such, as illustrated, the security features (e.g., features 2021/202J) may overlay another feature (e.g., feature 202J).

Moreover, the non-security features may be text or images produced to provide information relating to the document. In some embodiments, the non-security features (e.g., features 202G-H/202K-L) may be unique to the user (or owner) of the document 200. In some embodiments, the non-security features (e.g., features 202A-H/202K-L) may be generic to a plurality of documents and may be issued by the third-party devices 106A-C (of FIG. 1).

Figure 3:
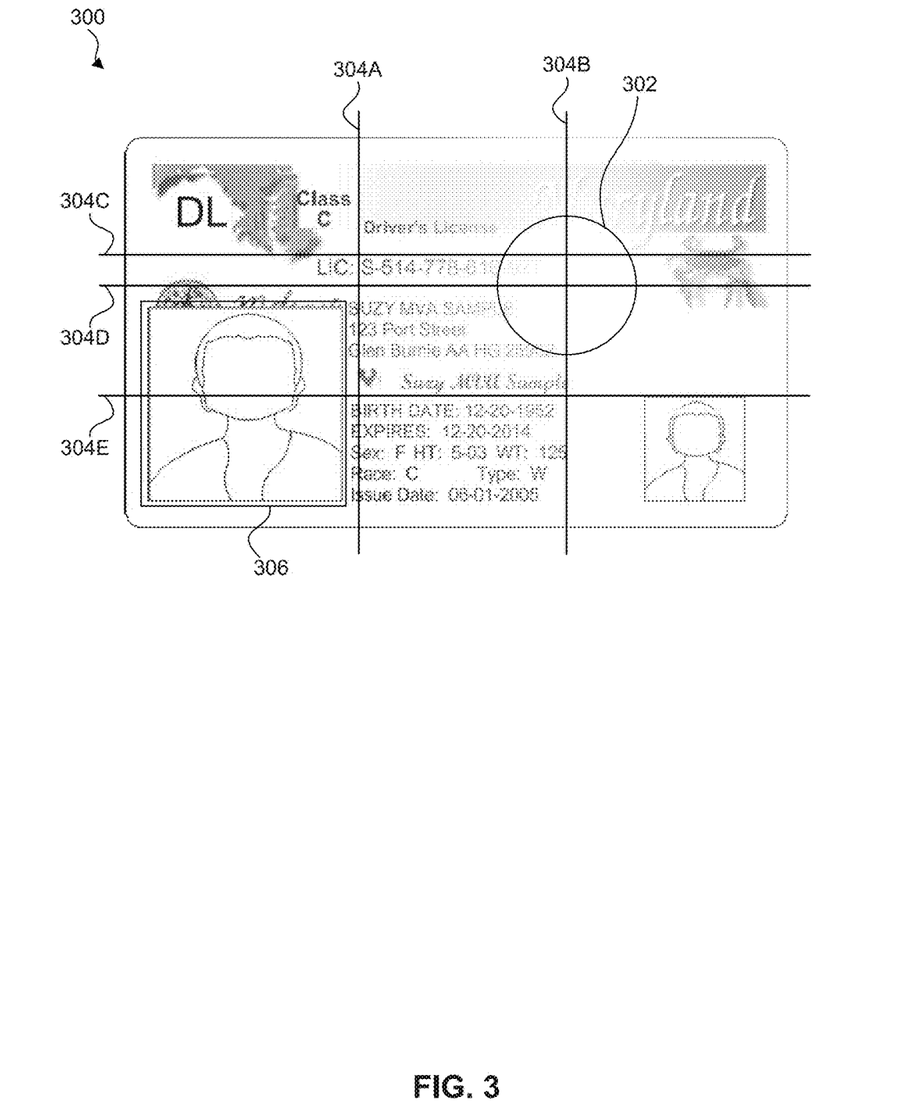
FIG. 3 illustrates an image of a document capable of being detected by the backend server of FIG. 1, according to some embodiments.

FIG. 3 illustrates an image of a document 300 segmented into a plurality of segments 304A-E, according to some embodiments. Upon receiving an image of the document 300, the backend server 102 (of FIG. 1) may segment the image of the document 300 in any logical order into a plurality of segments 304A-E. The number of segments shown is exemplary. In some embodiments, the backend server 102 may segment the image of the document 400 based on the placement of features on the document 300. For example, the backend server 102 may segment the image of the document 300 such that each security feature or non-security unique to a user (e.g., a picture of a user) covers at least a predetermined number of segments (e.g., two or four segments). Moreover, in some embodiments, the backend server 102 may segment the image of the document 300 based on a location of an imperfection 302 on the image of the document 300. For example, as illustrated, the backend server 102 may segment the image of the document such that the imperfection 302 encompasses (or overlays) an intersection of two segments 304B/304C.

Figure 4A:
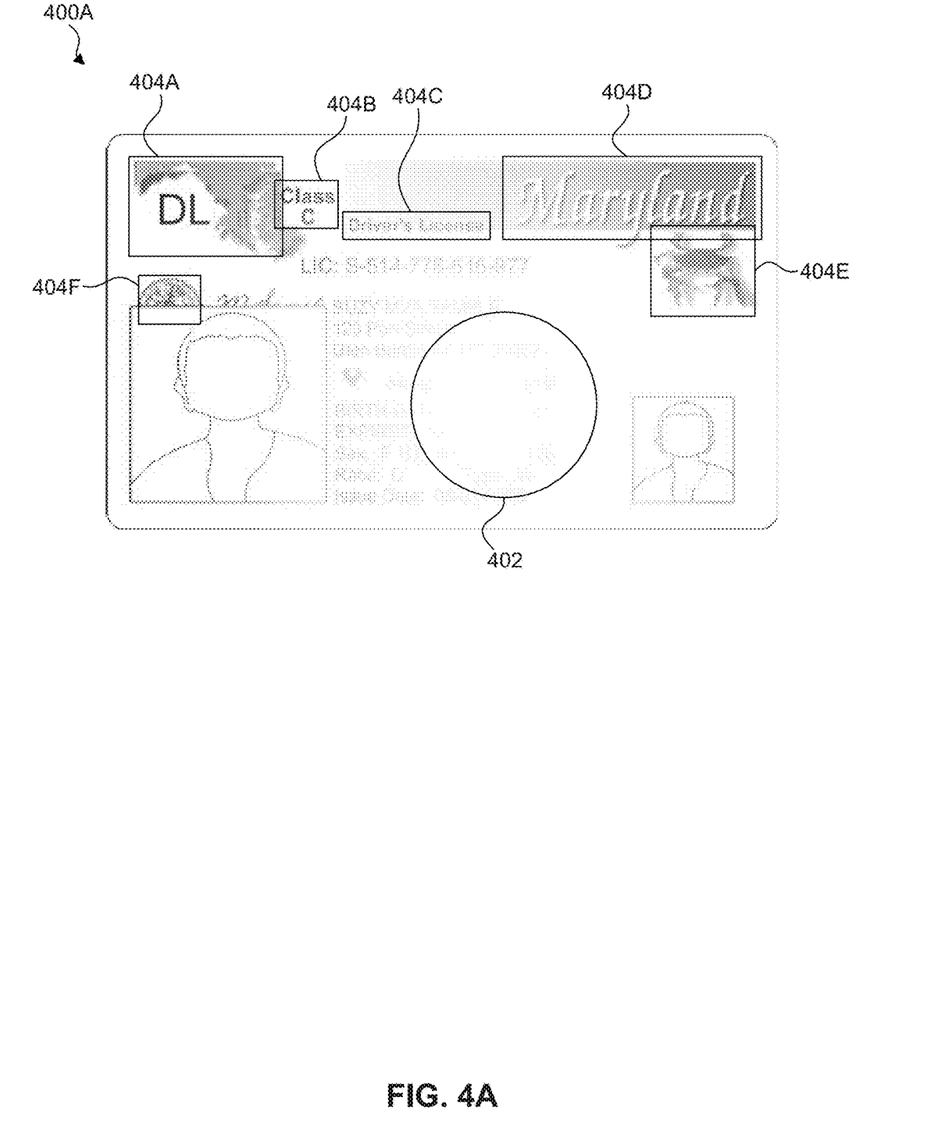
FIGS. 4A-C, 5 and 6 illustrate features of an image of a document detected by the backend server of FIG. 1, according to some embodiments.
Figure 4B:
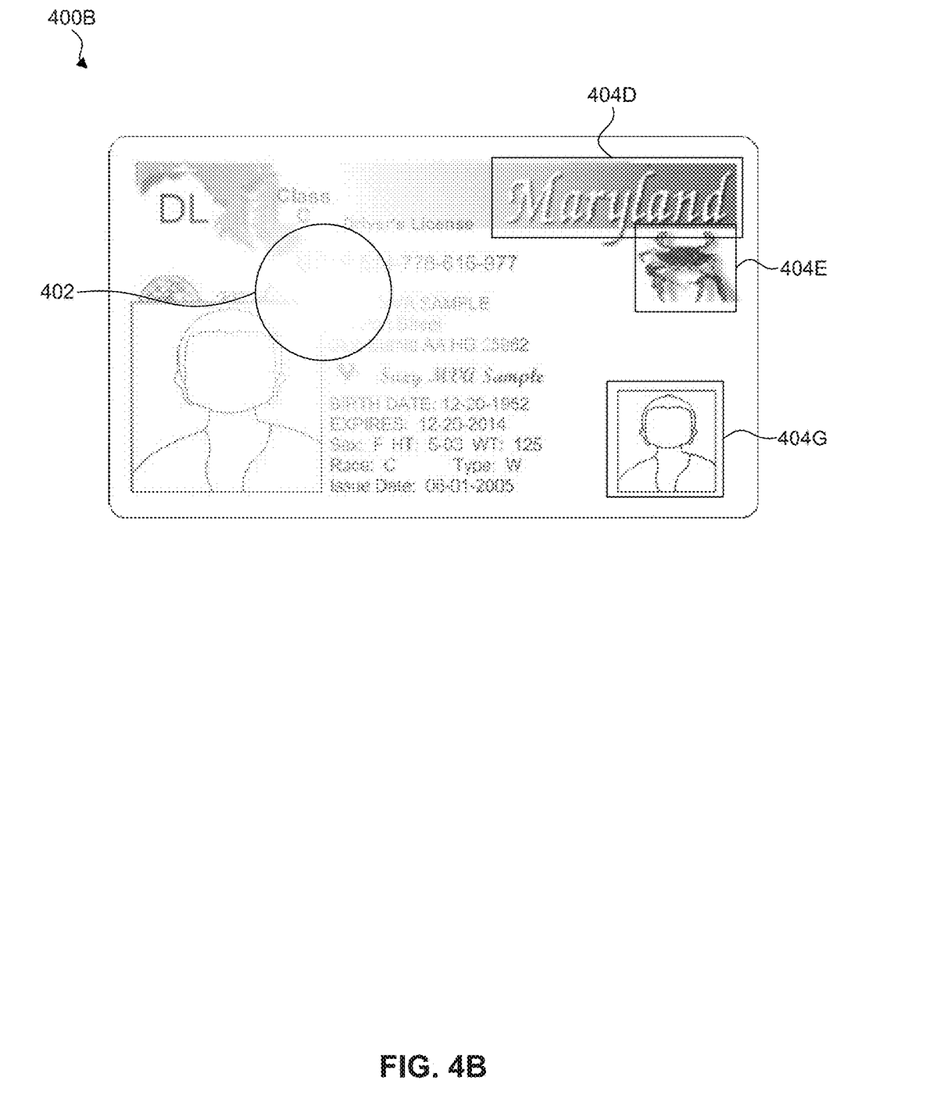
Figure 4C:
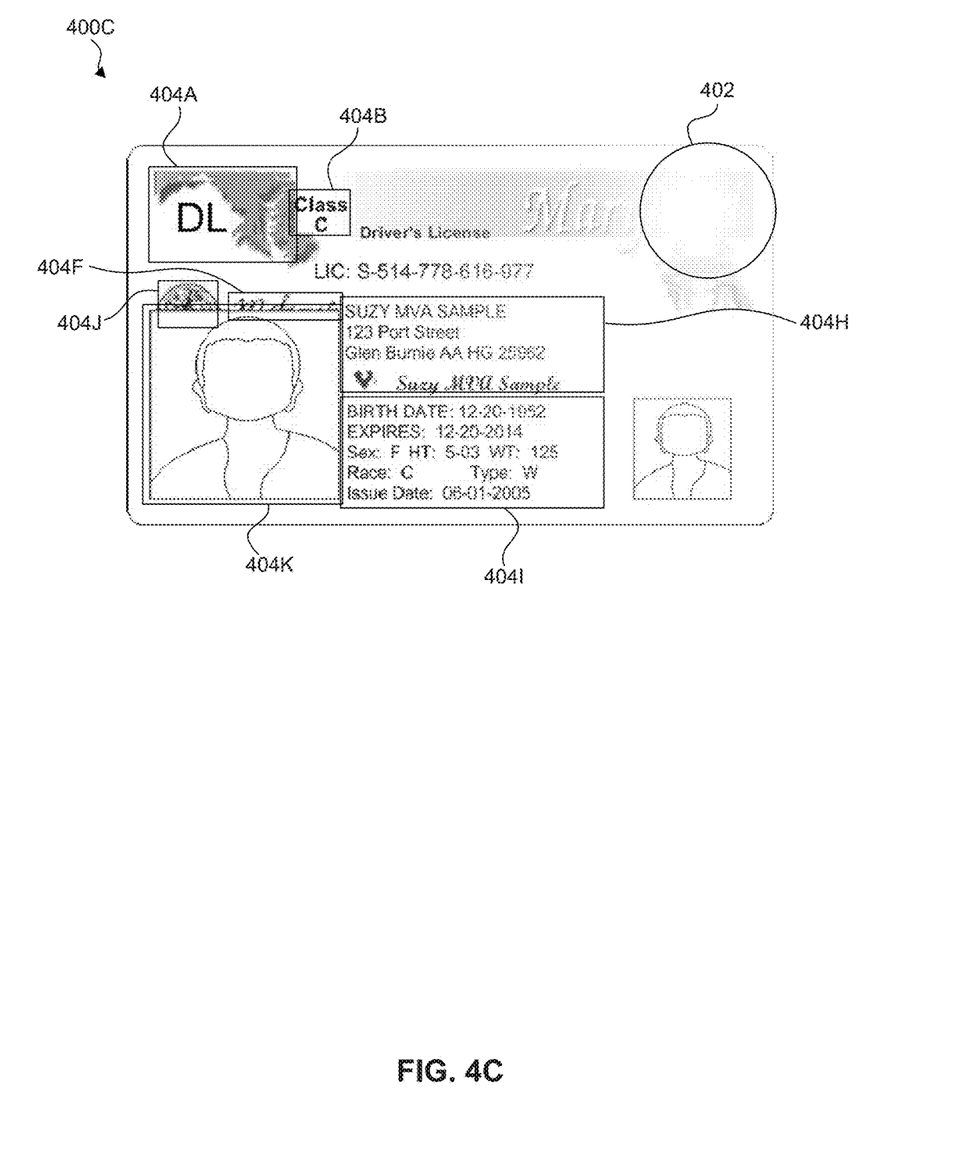

FIGS. 4A-C illustrate a series of images of a document 400A-C having features 404A-K detected by the backend server 102 (of FIG. 1. In some embodiments, although the backend server 102 detects the entire document (e.g., a contour of the document), the backend server 102 detects certain features 404A-K or portions thereof. Although the entire document is illustrated, the backend server 102 may detect portions of the document 400A-C, which may at least partially overlap. And in some embodiments, overlapping portions of the same feature may be detected in multiple images of the document 400A-C. As such, the detection of the document 400A-C or the features 400A-K thereof may be based on characteristics of images of the document 400A-C, such as a resolution, sharpness, noise, and contrast, just to name a few examples. Thus, backend server 102 (of FIG. 1) may require the features 404A-K to be above a predetermined image characteristic threshold. And the backend server 102 may continue to require additional images of the document 400A-C until sufficient data is received to reconstruct the document.

In some embodiments, in acquiring images of the document 400A-C, the images of the document 400A-C may have imperfections 402A-C on one or more portions that prevent accurate or sufficient detection of the features 404A-K or portions thereof on or around the imperfections 402A-C. For example, the first image of the document 400A may have a first imperfection 402A on a first portion of the image of the document 400A preventing detecting of certain features 404A-K or portions thereof. As such, this may require additional images of the document 400B-C with imperfections 402A-C on different portions of the image of the document 400B-C so that the certain features 404A-K or portions thereof may be detected. To do so, the user devices 104A-C may be moved or repositioned (e.g., at a different location or angle) so that the imperfections 402A-C are on different portions of the document and the backend server 102 (of FIG. 1) may detect different portions or features 404A-K of the document. The imperfections 402A-C may be a glare, a shadow, a low resolution, sharpness, noise, contrast, color accuracy, distortion, vignetting, exposure accuracy, lateral chromatic aberration, and color moiré, just to name a few examples.

In some embodiments, when detecting features 404A-K (or portions thereof) on the images of the document 400A-C, the backend server 102 (of FIG. 1) may determine their spatial domains. For example, the backend server 102 may determine the spatial domains of the features 404A-K based on an identified edge of the image of the document 400A or a pixel of the image of the document 400A having the best clarity (e.g., resolution). The backend server 102 may also determine the spatial domains of the features 404A-K or portions thereof based on the center of imperfections 402A-C. As such, the identified edge, the pixel of the image, or the center of the imperfections 402A-C may serve as a basis for measuring the spatial domains of feature 404A-K. For example, the identified edge, the pixel of the image, or the center of the imperfections 402A-C serves as an origin (e.g., spatial domain (0,0)) and a portion of a particular feature has a spatial domain of (5, 8) based on the origin.

Along these lines, after acquiring an image of the document (e.g., the initial image of the document 400A or the second image of the document 400B), the backend server 102 (of FIG. 1) requires further images of the document 400B-C to at least a portion of the previous image to be a part of the image and to be of sufficient quality based on characteristics of the image. As such, the backend server 102 reconstructs the image by overlapping the corresponding portions of the image (e.g., the first image of the document 400A with the second image of the document 400B, the first image of the document 400A with the third image of the document 400C, and/or the second image of the document 400B with the third image of the document 400C). In doing so, the backend server 102 compares the overlapping portions of the document (e.g., features 404A-K of the document).

The backend server 102 (of FIG. 1) then determines if there are any irregularities in the overlapping portions of the document, such as the portions of the document not aligning or having inconsistent characteristics (e.g., color or texture of words or images). For example, if one portion of the document has an inconsistent color or texture than another portion of the document, the backend server 102 may not verify the document. Similarly, if one portion does not properly overlap with another portion (e.g., their spatial domains not properly aligning), the backend server 102 may not verify the document. Likewise, if the timestamps of the portions of the document are beyond a predetermined amount of time (e.g., 15 seconds), the backend server 102 may not verify the document. Moreover, if the timestamps of the portions of the document are not continuous (e.g., within a predetermined amount of time), the backend server 102 may not verify the document. As such, if the backend server 102 detects any irregularities, the backend server 102 may restart the capture/verification process.

Along these lines, after receiving one or more of the images of the document and identifying features 404A-K or portions thereof, the backend server 102 (of FIG. 1) may verify the authenticity of the features 404A-K. This may be for portions of the document that were detected in the same or different images of the document 400A-C (e.g., on overlapping portions). For example, in some embodiments, once the backend server 102 detected an entire feature in one or more images of the document 400A-C, the backend server 102 may verify the authenticity of a particular feature. In some embodiments, once the backend server 102 derives an entire document from the images of the document 400A-C and the features 404A-K thereon, the backend server 102 may verify the authenticity of the document or the features thereon 404A-K.

As such, to verify the authenticity of the document, in some embodiments, the backend server 102 (of FIG. 1) may compare the complete image of the document or the features 404A-K thereon to an authentic document determined by the backend server 102. To do so, as described above, the backend server 102 may utilize a mathematical model derived from real and fictitious documents. Moreover, in some embodiments, the backend server 102 may compare the image of the document to an authentic image of the document received by third-party devices 106A-C (of FIG. 1). As such, in these embodiments, the backend server 102 may compare spatial domains and characteristics of features 404A-K in the derived image of the document to the authentic image of the document. In some embodiments, the backend server 102 may send the complete image of the document to the third-party devices 106A-C to determine if they are authentic.

FIGS. 4A-4C demonstrate an example of correcting for an imperfection 402A-C in an image of a document 400A-C.

FIG. 4A illustrates an initial image of a document 400A having features 404A-F detected by the backend server 102 (of FIG. 1). The backend server 102 (of FIG. 1) detects features 404A-D/404F in their entirety and a first portion of feature 404E. And the backend server 102 detects spatial domains of features 404A-F. In some embodiments, the backend server 102 detects the initial image of the document 400A having a first imperfection 402A in a center portion of the image of the document 400A, thus preventing detection of features on and around the imperfection 402A.

FIG. 4B illustrates a second image of the document 400B having features 404D-E/404G taken after the initial image of the document 400A (of FIG. 4A) and acquired by the backend server 102 (of FIG. 1). In some embodiments, although the entire document is illustrated, the backend server 102 may detect a second portion of the image of the document 400B (e.g., a right side of the document that contains features 404D-E/404G) that partially overlaps with the first portion of the initial image of the document 400A (of FIG. 1). As such, the backend server 102 detects features 404D/404G in their entirety and a second portion of feature 404E. The second portion of feature 404E (of FIG. 4B) may overlap with the first portion of feature 404E (of FIG. 4A). And the first portion of feature 404E (of FIG. 4A) and the second portion of the feature 404E (of FIG. 4B) may complete and form the entire feature 404E. And the backend server 102 detects spatial domains of features 404D-E/404G.

In some embodiments, the backend server 102 detects the second image of the document 400B having a second imperfection 402B in an upper, left portion of the second image of the document 400B, thus preventing detection of features on or around the imperfection 402B. In some embodiments, the backend server 102 may require that the second imperfection 402B be a predefined distance from the first imperfection 402A (of FIG. 4A).

FIG. 4C illustrates a third image of the document 400B having features 404A-B/404F/404H-K taken after the initial and second images of the document 400A-B (of FIGS. 4A-B, respectively) and acquired by the backend server 102 (of FIG. 1). Although the entire document is illustrated, the backend server 102 may detect a third portion of the image of the document 400C (e.g., the left side of the document that contains features 404D-E/404G) that partially overlaps the first or second portions of the initial or second images of the document 400A-B (of FIG. 4A-B, respectively). The backend server 102 detects features 404A-B/404F/404I-K in their entirety. And the backend server 102 detects spatial domains of features 404A-B/404F/404I-K. As such, in some embodiments, the backend server 102 may detect features 404A-B or portions thereof in previous images of the document 400A.

Still referring to FIG. 4C, the backend server 102 (of FIG. 1) detects the third image of the document 400C having a third imperfection 402C in an upper, right corner of the third image of the document 400C, thus preventing detection of other features of the document on and there around the second imperfection 402C. In some embodiments, the backend server 102 may require that the third imperfection 402C be a predefined distance from the first or second imperfections 402A-B (of FIGS. 4A-B, respectively).

Moreover, upon receipt of the third image of the document 400C, the backend server 102 (of FIG. 1) may determine that sufficient images of the document have been received to provide a full and complete image of the document. The backend server 102 determines if the overlapping portions have any irregularities. Thereafter, the backend server 102 determines if the complete image of the document is authentic based on the authentic image of the document received from an authorized third party.

Figure 5:
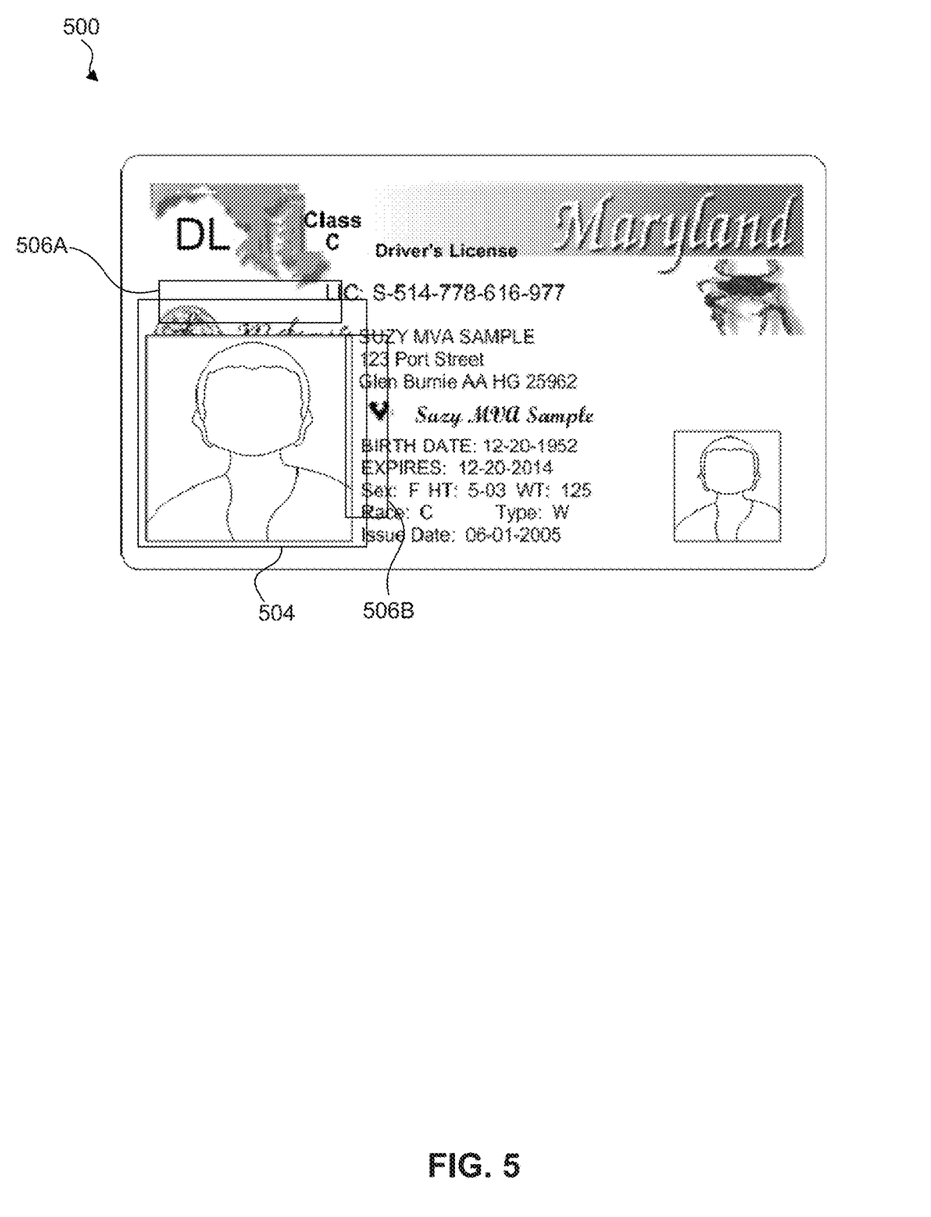
Figure 6:
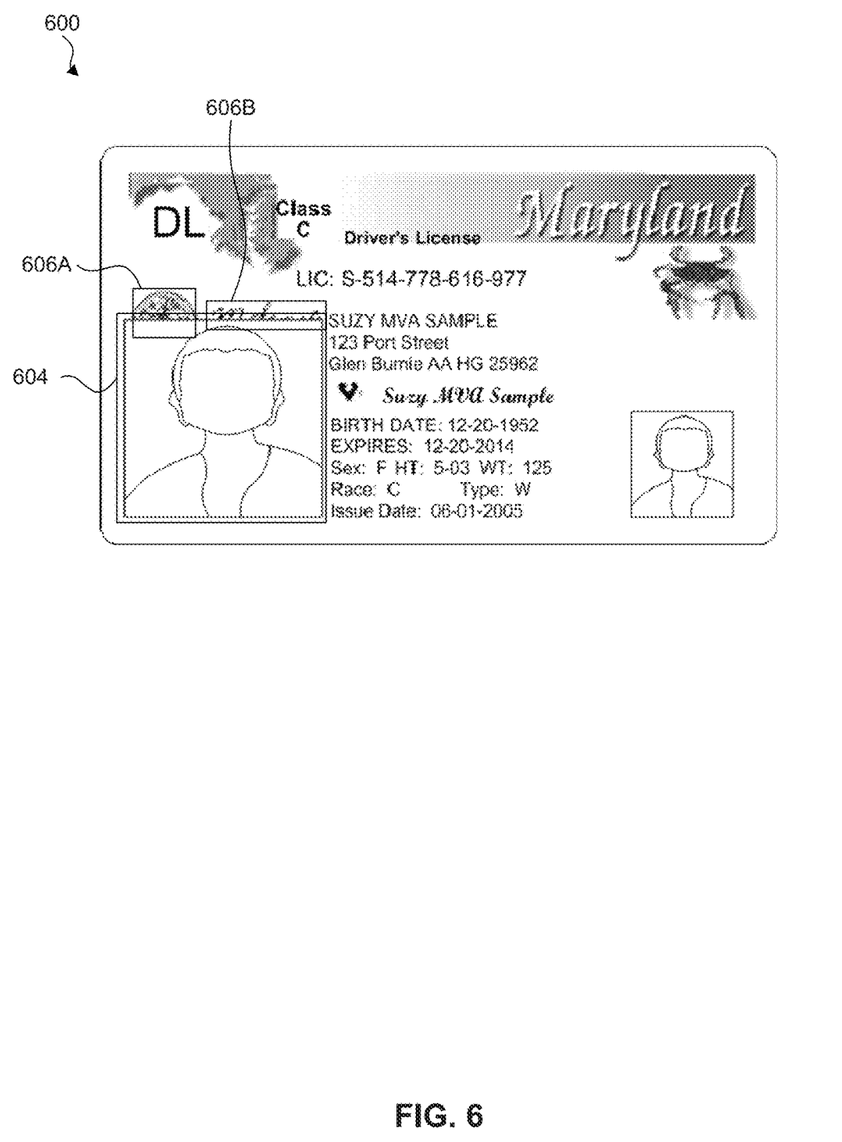

FIGS. 5 and 6 illustrate features 504/604 of the image of the document 500/600 requiring additional verification by backend server 102 (of FIG. 1) to confirm authenticity, according to some embodiments. This may assist the backend server 102 in detecting when an image was recreated with a feature from a different document than that being received by the backend server 102.

Referring now to FIG. 5, the backend server 102 (of FIG. 1) detects or constructs an entire feature 504/604. The feature 504/604 may be a security feature or non-security feature. And the feature 504/604 may be unique to an owner of the document, such as to illustrate ownership of the document. For example, as shown in FIG. 5, the feature 504/604 may be a picture of the driver's license's owner.

As such, in some embodiments, to verify the feature 504, the backend server 102 (of FIG. 1) may first detect or derive the feature 504 in its entirety in a particular image of the document. The backend server 102 may then acquire one or more portions of the document 506A-B that overlap with the feature 504 in subsequent images of the document 500. Likewise, the backend server 102 may identify one or more portions of the document 506A-B that overlap with the feature 504 in previous images of the document 500. By operating in such a fashion, the backend server 102 accounts for transitions of the feature 504 to other portions of the document 506A-B. As such, the backend server 102 determines if the feature 504 has been altered from its original state by analyzing the edges of the feature 504. For example, in some embodiments, the backend server 102 may determine if a fake picture was provided on top of an original picture of a driver's license.

Referring now FIG. 6, to verify the feature 604, the backend server 102 (of FIG. 1) may also detect security features 606A-B at least partially overlapping with the feature 604 in subsequent images of the document 600. The security features 606A-B may be detected in previous or subsequent images from the feature 604. In some embodiments, the portions of the security features 606A-B overlapping with the feature 604 may not be visible. In some embodiments, the portions of the security features 606A-B overlapping with the feature 604 may not have colors of the remaining portions of the security features 606A-B but may continue to provide an imprint onto feature 604.

Figure 7:
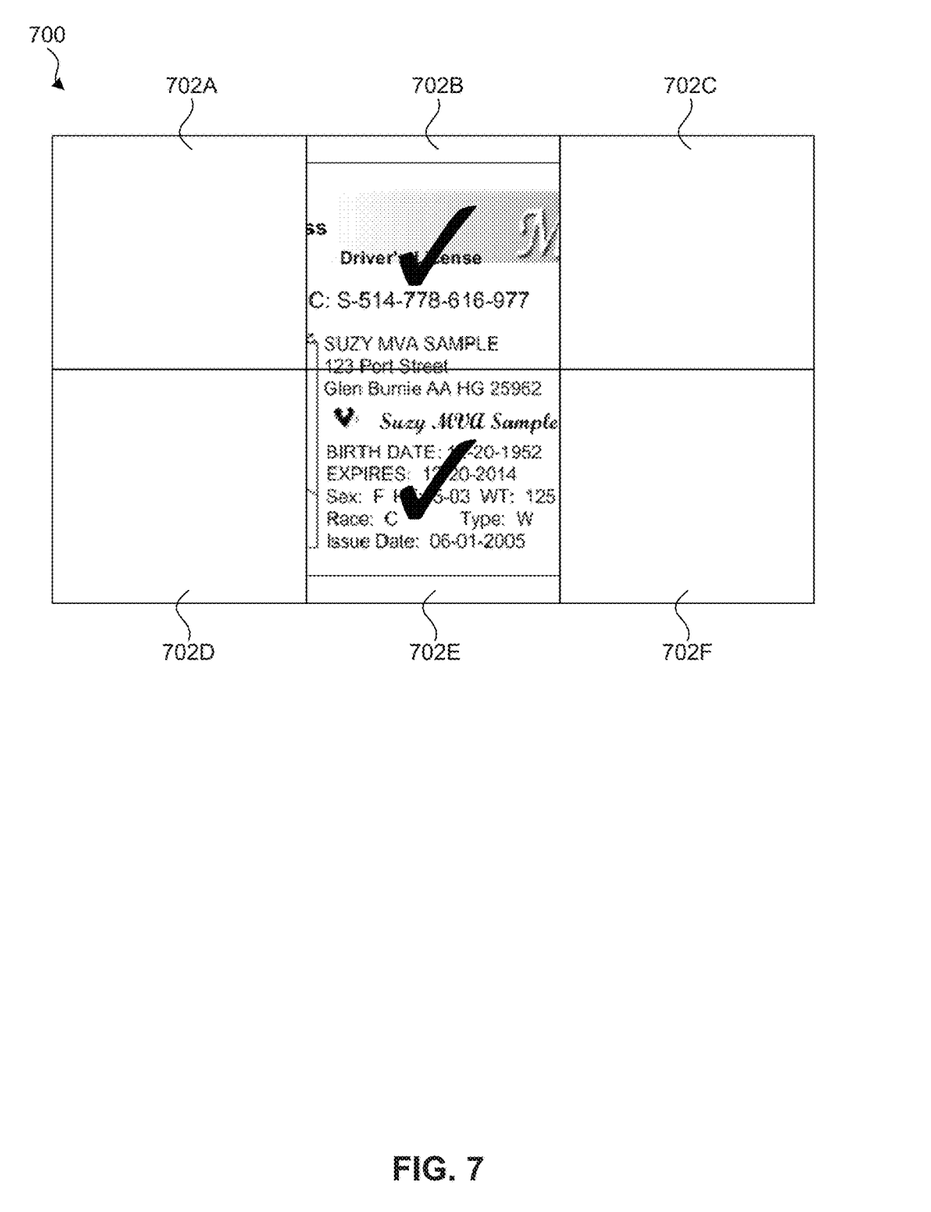
FIG. 7 illustrates a user interface for identifying portions of a document received by the backend server of FIG. 1, according to some embodiments.

FIG. 7 illustrates a user interface 700 of a computer application installed on user devices 104A-C to upload the document to backend server 102 (of FIG. 1). User interface 700 may present a plurality of segments 702A-F for identifying portions of the document received by the backend server 102 (of FIG. 1). The segments 702A-F may correspond to the number of segments 304 (of FIG. 3) determined by the backend server 102 in processing the document as discussed above. As such, in some embodiments, the number of segments 702A may depend on the number of features, the type of features (e.g., security or non-security feature), and/or location of the features. For example, the user interface 700 may provide a security feature at an intersection of multiple segments 702A-F. As such, the user of user devices 104A-C may be able to know which portions of the document have been received and successfully processed by the backend server 102.

In some embodiments, the user interface 700 may not prove any indication of what features of the document correspond to specific segments 702A-F. In some embodiments, the user interface 700 may request a user to zoom to a certain portion of the document, for example, corresponding to a particular segment 702A-F. This may allow the backend server 102 (of FIG. 1) to have an image with better characteristics (e.g., resolution, sharpness, noise, and contrast). In some embodiments, the user interface may direct the users on how to move the user devices 104A-C to acquire images including portions of the document corresponding to specific segments 702A-F. In some embodiments, after the backend server 102 receives or verifies segments 702B/702E, the user interface 702 may present a symbol (e.g., a checkmark) over the portion of the document in the segments 702B/702E.

Figure 8:
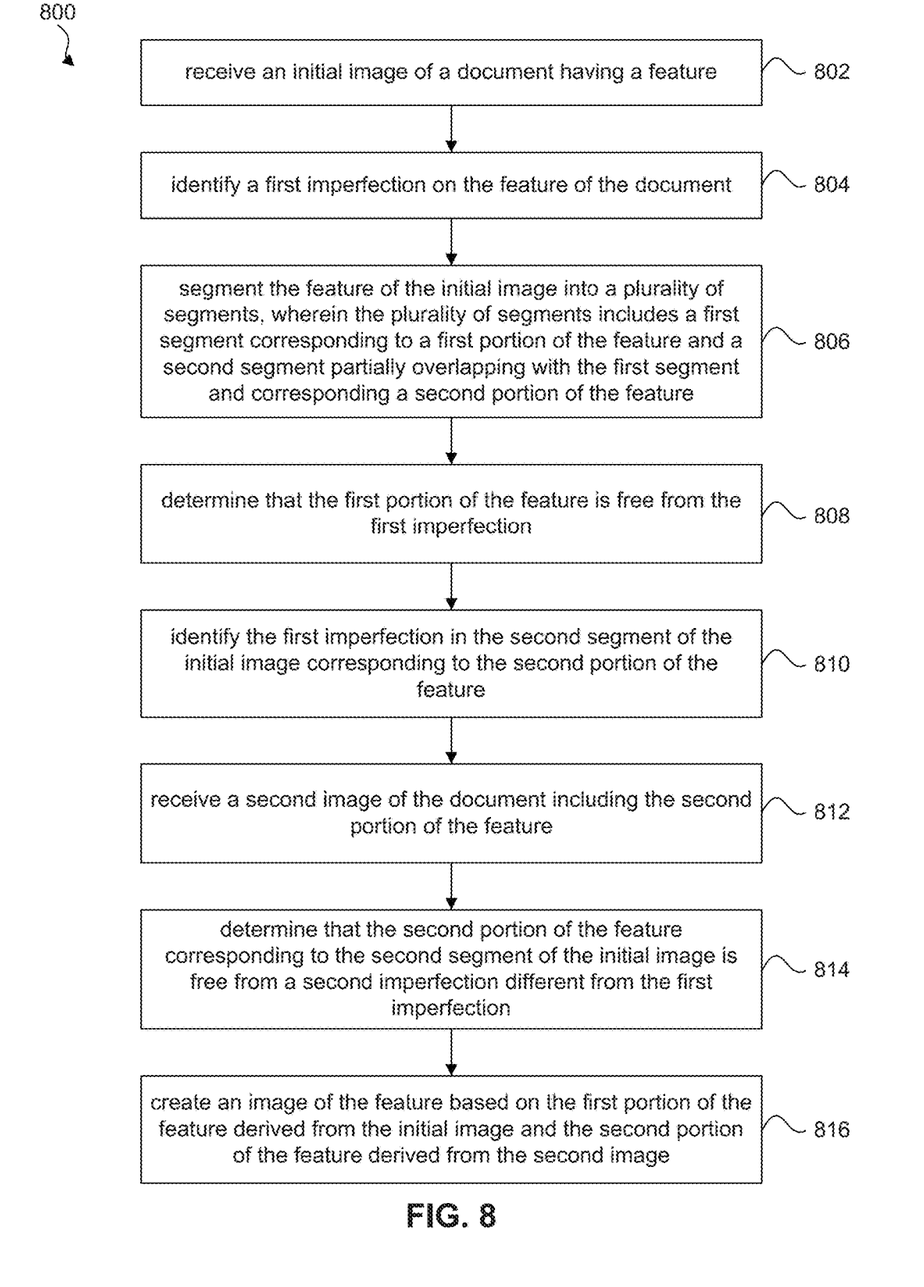
FIG. 8 illustrates a flowchart illustrating a method for verifying a document, according to some embodiments.

FIG. 8 illustrates a flowchart for a method 800 for verifying a document, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIGS. 1, 3, and 4A-C. However, method 800 is not limited to those example embodiments.

In 802, the backend server 102 receives an initial image of a document 400A having a feature 404A-K.

In 804, backend server 102 identifies a first imperfection 402A on the feature of the document.

In 806, backend server 102 segments the feature of the initial image of the document 300/400 into a plurality of segments 304A-E such that the plurality of segments includes a first segment 304C corresponding to a first portion of the feature 404E and a second segment 304B partially overlapping with the first segment 304C and corresponding to a second portion of the feature 404E.

In 808, backend server 102 determines that the first portion of the feature 404E is free from the first imperfection 402A.

In 810, backend server 102 identifies the first imperfection 402A in the second segment of the initial image as corresponding to the second portion of the feature.

In 812, backend server 102 receives a second image of the document 400B including the second portion of the feature corresponding to the second segment of the initial image.

In 814, backend server 102 determines that the second portion of the feature 404E in the second image is free from a second imperfection 402B different from the first imperfection 402A.

In 816, backend server 102 creates an image of the feature 404E based on the first portion of the feature 404E derived from the initial image 400A and the second portion of the feature 404E derived from the second image 400B. For example, backend server 102 creates the image of the feature 400E based on overlapping portions of the initial image 400A's first portion of the feature 404E and the second image 400B's second portion of the feature 404E. In doing so, backend server 102 determines whether the spatial coordinates of the overlapping portions match. If the spatial coordinates do match, backend server 102 creates the composite image of the feature 404E. However, if the spatial coordinates do not match, backend server 102 may require additional images of the first portion of the feature 404E and/or the second portion of the feature 404E.

Figure 9:
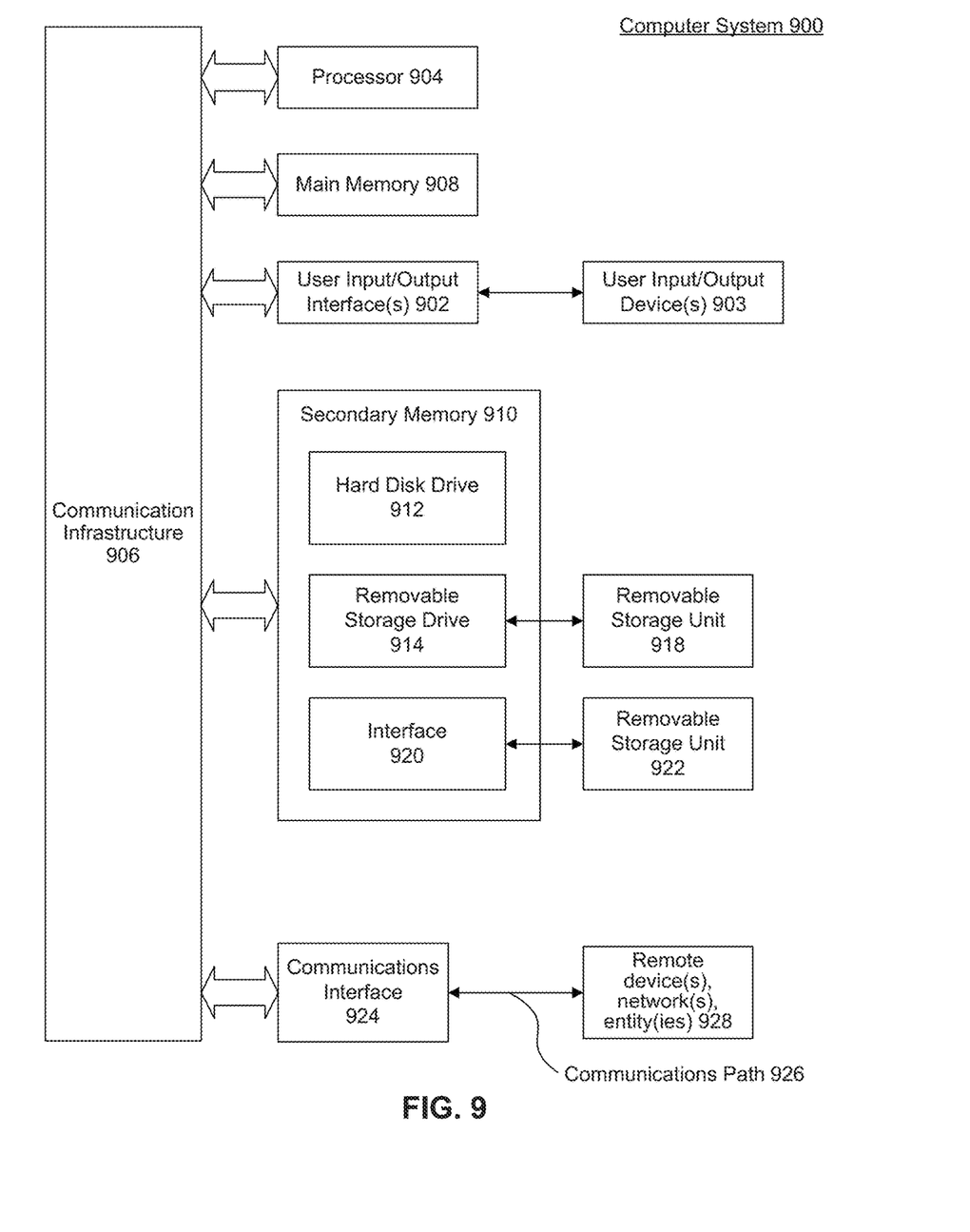
FIG. 9 illustrates an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to a removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method, comprising:
    receiving an initial image of a document having a feature;
    identifying a first imperfection on the feature;
    segmenting the feature into a plurality of segments, wherein the plurality of segments includes a first segment corresponding to a first portion of the feature and a second segment partially overlapping with the first segment and corresponding to a second portion of the feature;

determining that the first portion of the feature is free of the first imperfection;

identifying the first imperfection in the second segment of the initial image corresponding to the second portion of the feature;

receiving a second image of the document including the second portion of the feature corresponding to the second segment of the initial image;

determining that the second portion of the feature in the second image is free of a second imperfection different from the first imperfection of the feature in the initial image; and creating an image of the feature based on the first portion of the feature derived from the initial image and the second portion of the feature derived from the second image.

2. The computer-implemented method of claim 1, wherein the initial image includes only the feature.

3. The computer-implemented method of claim 2, wherein the second image includes only the second portion of the feature.

4. The computer-implemented method of claim 1, wherein the feature is a security feature or a non-security feature of the document.

5. The computer-implemented method of claim 1, wherein the first imperfection and the second imperfection are from a user acquiring the initial image and the second image, respectively.

6. The computer-implemented method of claim 1, wherein the second image also includes the first portion of the feature or a third portion of the feature different from the first portion of the feature and the second portion of the feature.

7. The computer-implemented method of claim 6, wherein the second imperfection is on the third portion of the feature.

8. The computer-implemented method of claim 1, further comprising:

determining a spatial relationship between the partially overlapping portion of the first portion and the second portion of the feature acquired from the initial image and second image, respectively; and aligning the first portion of the feature and the second portion of the feature based on the spatial relationship.

9. The computer-implemented method of claim 8, further comprising:

after the aligning of the first portion of the feature with the second portion of the feature, determining a spatial position of the first imperfection in the initial image;

identifying the second imperfection in the second image;

determining a spatial position of the second imperfection in the second image; and determining that the spatial position of the second imperfection in the second image is a predetermined distance from the first imperfection in the initial image, wherein the creating of the image of the feature is based on the spatial position of the second imperfection in the second image being the predetermined distance from the first imperfection in the initial image.

10. The computer-implemented method of claim 1, further comprising:

sending a message to a user to capture a portion of the document including the second portion of the feature.

11. The computer-implemented method of claim 1, further comprising:

sending a message to a user to capture a plurality of different portions of the document so that a complete document is received.

12. The computer-implemented method of claim 1, further comprising:

determining a feature map comprising the feature for the document; and determining that the first portion of the feature, the second portion of the feature, or the image of the feature is real or fake based on the feature map.

13. The computer-implemented method of claim 12, the determining of the feature map comprising:

receiving an authenticated document including the feature from an external source; and creating the feature map based on the authenticated document.

14. The computer-implemented method of claim 12, the determining of the feature map comprising:

receiving a plurality of real documents and a plurality of fake documents; and creating the feature map for a real document based on the plurality of real documents and the plurality of fake documents.

15. The computer-implemented method of claim 1, wherein the first imperfection and the second imperfection is a glare, a shadow, or a lack of resolution.

16. The computer-implemented method of claim 1, wherein the document verifies an identity of a user.

17. The computer-implemented method of claim 1, wherein the feature is an edge of the document, an image of a user on the document, or a unique number or text assigned to the user.

18. The computer-implemented method of claim 1, wherein the initial image and the second image are taken by a camera of a user device.

19. A non-transitory computer-readable device having instructions stored thereon that, when executed by at least one computing device, cause the at least one computing device to perform operations comprising:

receiving an initial image of a document having a feature;

identifying a first imperfection on the feature;

segmenting the feature into a plurality of segments, wherein the plurality of segments includes a first segment corresponding to a first portion of the feature and a second segment partially overlapping with the first segment and corresponding to a second portion of the feature;

determining that the first portion of the feature is free of the first imperfection;

identifying the first imperfection in the second segment of the initial image corresponding to the second portion of the feature;

receiving a second image of the document including the second portion of the feature corresponding to the second segment of the initial image;

determining that the second portion of the feature is free of a second imperfection different from the first imperfection of the feature in the initial image; and creating an image of the feature based on the first portion of the feature derived from the initial image and the second portion of the feature derived from the second image.

* * * * *

UNITED STATES PATENT AND TRADEMARK OFFICE
CERTIFICATE OF CORRECTION

PATENT NO. : 10,515,266 B1
APPLICATION NO. : 16/542446
DATED : December 24, 2019
INVENTOR(S) : Jarvis et al.

Page 1 of 1

It is certified that error appears in the above-identified patent and that said Letters Patent is hereby corrected as shown below:

In the Specification

In Column 4, Line 39, delete "2021/" and insert --202I/--.

In Column 4, Line 54, delete "2021" and insert --202I--.

In Column 4, Line 56, delete "2021" and insert --202I--.

In Column 4, Line 58, delete "2021/" and insert --202I/--.

Signed and Sealed this
Eighteenth Day of February, 2020

Andrei Iancu
*Director of the United States Patent and Trademark Office*